(12) United States Patent
Jiang et al.

(10) Patent No.: US 11,177,876 B2
(45) Date of Patent: Nov. 16, 2021

(54) METHOD FOR CONFIGURING AND OPERATING REDUNDANT PATH IN QUANTUM COMMUNICATION NETWORK

(71) Applicant: SOOCHOW UNIVERSITY, Suzhou (CN)

(72) Inventors: Min Jiang, Suzhou (CN); Tao Cai, Suzhou (CN); Zhixin Xia, Suzhou (CN); Qing Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/977,963

(22) PCT Filed: Mar. 14, 2018

(86) PCT No.: PCT/CN2018/078924
§ 371 (c)(1),
(2) Date: Sep. 3, 2020

(87) PCT Pub. No.: WO2019/169651
PCT Pub. Date: Sep. 12, 2019

(65) Prior Publication Data
US 2020/0412444 A1 Dec. 31, 2020

(30) Foreign Application Priority Data
Mar. 9, 2018 (CN) .......................... 201810192894.7

(51) Int. Cl.
*H04B 10/032* (2013.01)
*H04B 10/70* (2013.01)
(52) U.S. Cl.
CPC ........... *H04B 10/032* (2013.01); *H04B 10/70* (2013.01)
(58) Field of Classification Search
None
See application file for complete search history.

(56) References Cited

U.S. PATENT DOCUMENTS 5,777,761 A * 7/1998 Fee ...................... H04J 14/0291
370/225
6,690,884 B1 * 2/2004 Kelty ................... H04B 10/695
398/27

(Continued)

FOREIGN PATENT DOCUMENTS

CN 101155063 A * 4/2008
CN 101155063 A 4/2008

(Continued)

OTHER PUBLICATIONS

"Research on Topology and Routing Algorithm of Quantum Key Distribution Network", Baogang Hou, Master Thesis, Xidian University, Dec. 15, 2013.

*Primary Examiner* — Darren E Wolf
(74) *Attorney, Agent, or Firm* — SZDC Law PC (57) ABSTRACT

The invention relates to a method for setting and operating redundant paths in a quantum communication network, wherein a transmitter implements simultaneous transmission of signals on a working path and protection paths. The signal transmitted on the working path is a primary signal, and the signals transmitted on the protection paths are follow-up signals. In a case that the working path is normal, the transmitter forwards the primary signal on the working path level by level, to implement long distance transmission of a quantum signal. In a case that the working path fails, a proxy working path is selected from the remaining protection paths with the highest priority, and the transmission of information is eventually completed on the proxy working path. It can be prevented that unknown quantum information is damaged and becomes unrecoverable during transmission, thereby greatly improving the security, stability, and reliability of information transmission during quantum communication.

2 Claims, 3 Drawing Sheets

(56) References Cited

U.S. PATENT DOCUMENTS

| | | | | |
|---|---|---|---|---|
| 6,839,515 B1* | 1/2005 | Jahreis | ............... | H04B 10/032 |
| | | | | 340/2.9 |
| 2003/0215231 A1* | 11/2003 | Weston-Dawkes | ......................... | |
| | | | | H04J 14/0294 |
| | | | | 398/19 |
| 2006/0120718 A1* | 6/2006 | Natori | ............... | H04J 14/0295 |
| | | | | 398/19 |
| 2006/0239463 A1* | 10/2006 | Young | ................... | H04B 10/70 |
| | | | | 380/278 |
| 2008/0089696 A1* | 4/2008 | Furuta | .................. | H04L 9/0855 |
| | | | | 398/175 |
| 2009/0074192 A1* | 3/2009 | Beal | ..................... | H04L 9/0858 |
| | | | | 380/278 |
| 2010/0299526 A1* | 11/2010 | Wiseman | ............. | H04L 63/061 |
| | | | | 713/171 |
| 2018/0262276 A1* | 9/2018 | Bishop | .................. | H04B 10/70 |

FOREIGN PATENT DOCUMENTS

| | | |
|---|---|---|
| CN | 101192883 A | 6/2008 |
| CN | 101330344 A | 12/2008 |
| WO | 2004036800 A2 | 4/2004 |

* cited by examiner

METHOD FOR CONFIGURING AND OPERATING REDUNDANT PATH IN QUANTUM COMMUNICATION NETWORK

This application is the National Stage Application of PCT/CN2018/078924, filed on Mar. 14, 2018, which claims priority to Chinese Patent Application No. 201810192894.7, filed on Mar. 9, 2018, which is incorporated by reference for all purposes as if fully set forth herein.

FIELD OF THE INVENTION

The present invention belongs to the field of communication network technology, and more particularly to a method for setting and operating redundant paths in a quantum communication network.

DESCRIPTION OF THE RELATED ART

Quantum communication is a novel communication manner of transferring information by using a quantum entanglement effect based on the basic principle of quantum mechanics. Compared with a conventional communication manner, quantum communication has characteristics such as absolute security and high efficiency of transmission. Therefore, quantum communication becomes a worldwide research focus and has also drawn wide attention in the society. Quantum communication mainly includes quantum teleportation, quantum password communication, quantum dense coding, and the like. In recent years, with the development of the quantum communication technology, quantum communication gradually develops towards networking. A quantum communication network utilizes a quantum communication system, and is formed by a plurality of separate nodes. Corresponding quantum information is stored at each node. In an actual application of long distance transmission, because a signal is inevitably subject to attenuation and loss during transmission, signal repeating needs to be adopted during transmission. In signal repeating, a number of quantum repeaters are mainly established in a channel between a transmitter and a receiver. A signal is forwarded level by level to implement long distance transmission of a quantum signal. However, in the quantum communication system with such a structure, a link in a path may fail for many reasons. As a result, transmitted unknown quantum information may be lost and no reply is received. The operation reliability of a network determines the survivability of the network. Therefore, an adequate security protection mechanism is established in quantum communication to effectively protect unknown quantum information during transmission, and this is essential for improving the stability and reliability of a quantum communication network.

SUMMARY OF THE INVENTION

To solve the foregoing technical problems, the object of the present invention is to provide a method for setting and operating redundant paths in a quantum communication network, to improve the stability and reliability of a quantum communication network.

A method for setting and operating redundant paths in a quantum communication network of the present invention includes:

path selection: when one node needs to transmit information in an unknown quantum state to another node in a network, establishing n possible paths, where one of the paths is used as a working path, the remaining n−1 paths are used as protection paths, and the paths do not intersect with each other; and signal transmission: implementing simultaneous transmission of signals on the working path and the protection paths, where the signal transmitted on the working path is a primary signal, and the signals transmitted on the protection paths are follow-up signals; in a case that the working path is normal, forwarding the primary signal on the working path level by level, to eventually implement long distance transmission of the signal; in a case that the working path fails, selecting a proxy working path from the remaining protection paths with the highest priority, and discarding the original working path, where the proxy working path maintains the transmission of the primary signal, and the other remaining protection paths are used as protection paths for the proxy working path to maintain the transmission of the follow-up signals; and if the proxy working path also fails, reselecting a working path from the remaining protection paths according to priority, discarding the original proxy working path, and repeating this process, until a transmission task is successfully completed.

Preferably, the signal transmission includes:

preparing a corresponding quantity of auxiliary particles according to the selected working path, the protection paths, and a priority order of the paths, and sequentially performing a CNOT operation by using a particle to be transmitted as a control particle and other auxiliary particles as target particles;

performing, by a transmitter, a corresponding Bell measurement on a particle in a Bell channel formed between the transmitter and a node adjacent to the transmitter and a particle possessed by the transmitter, to implement the simultaneous transmission of the primary signal and the follow-up signals; in a case that the working path does not fail, if a transmission state is successfully transmitted to the last node, performing, by a current node, a Bell measurement, instructing other nodes to first separately perform an H transform, then performing a measurement by using the basis $|0\rangle$, $|1\rangle$, and finally transmitting measurement results to a receiver; if a path fails, first performing an H transform at a faulty node to which the information is transmitted, then performing a measurement by using the basis $|0\rangle$, $|1\rangle$, disabling the working path in this case, and switching to a proxy working path, where the proxy working path is a remaining protection path with the highest priority and maintains the transmission of the primary signal; maintaining the normal transmission of the follow-up signals on the other protection paths; and after the primary signal is transmitted to the last node of the proxy working path, in a case that it is ensured that the path is normal, instructing other nodes to first separately perform an H transform, then performing a measurement by using the basis $|0\rangle$, $|1\rangle$, performing, by the last node, a Bell measurement, and informing the receiver of final measurement results; and choosing, by the receiver, a corresponding unitary operation according to the measurement results of the nodes to determine the information in an unknown quantum state transmitted by Alice.

Preferably, the shortest path is selected as the working path, and a path with the fewest nodes is selected as the shortest path by default; when a plurality of paths have the same quantity of nodes, a path with high priority is preferentially selected; and protection paths are set by using a CNOT operation, and priority is differentiated.

By means of the foregoing solution, the method for setting and operating redundant paths in a quantum communication network of the present invention has the following advantages.

In the present invention, a plurality of quantum channels are established in advance before information in an unknown quantum state is transmitted. One of the quantum channels is used as a working channel, and the remaining quantum channels are used as protection channels. The paths do not intersect with each other. A transmitter implements simultaneous transmission of signals on the working path and the protection paths. The signal transmitted on the working path is a primary signal, and the signals transmitted on the protection paths are follow-up signals. In a case that the working path is normal, the transmitter forwards the primary signal on the working path level by level, to eventually implement long distance transmission of a quantum signal. In a case that the working path fails, a proxy working path is selected from the remaining protection paths with the highest priority, and the transmitter completes the transmission of information on the proxy working path. Protection paths are established during quantum communication, and thus the stability and reliability of quantum communication are greatly improved.

The foregoing description is merely brief description of the technical solution of the present invention. For a clearer understanding of the technical means of the present invention and implementation according to the content of the specification, the preferred embodiments of the present invention are described below in detail with reference to the accompanying drawings.

DETAILED DESCRIPTION OF THE PREFERRED EMBODIMENTS

Specific implementations of the present invention are further described below in detail with reference to the accompanying drawings and embodiments. The following embodiments are used to describe the present invention, but are not used to limit the scope of the present invention.

The technical terms of the present invention are described:

1. Path Selection

It is set that the form $$\frac{1}{\sqrt{2}}(|00\rangle + |11\rangle)$$

of a Bell state is used between two adjacent links.

2. Hadamard Gate

A Hadamard gate is also referred to as an H transform. The function of the Hadamard gate may be represented as follows:

$$H = \frac{1}{\sqrt{2}}[(|0\rangle + |1\rangle)\langle 0| + (|0\rangle - |1\rangle)\langle 1|]$$
$$= \frac{1}{\sqrt{2}}\begin{pmatrix} 1 & 1 \\ 1 & -1 \end{pmatrix}$$

The operation on a single bit in the Hadamard gate is expressed as follows:

$$H|0\rangle = \frac{1}{\sqrt{2}}(|0\rangle + |1\rangle)$$

$$H|1\rangle = \frac{1}{\sqrt{2}}(|0\rangle - |1\rangle)$$

3. Quantum Controlled-NOT Gate

A quantum controlled-NOT gate (or a CNOT gate) has two input quantum bits, namely, a control quantum bit and a target quantum bit. The function of the CNOT gate is: when the control quantum bit is $|0\rangle$, the state of the target quantum bit does not change, and when the control quantum bit is $|1\rangle$, the state of the target quantum bit is inverted. A matrix form corresponding to the CNOT gate is:

$$C_{NOT} = \begin{pmatrix} 1 & 0 & 0 & 0 \\ 0 & 1 & 0 & 0 \\ 0 & 0 & 0 & 1 \\ 0 & 0 & 1 & 0 \end{pmatrix}$$

4. Bell Basis

A Bell basis is a maximally entangled state formed by two particles, and forms a group of complete orthogonal basis of a four-dimensional Hilbert space. A specific form is as follows:

$$|\phi^+\rangle = \frac{1}{\sqrt{2}}(|00\rangle + |11\rangle),$$

$$|\phi^-\rangle = \frac{1}{\sqrt{2}}(|00\rangle - |11\rangle),$$

$$|\psi^+\rangle = \frac{1}{\sqrt{2}}(|01\rangle + |10\rangle),$$

$$|\psi^-\rangle = \frac{1}{\sqrt{2}}(|01\rangle - |10\rangle).$$

5. H Measurement

In an H measurement, a particle to be tested first passes through a Hadamard gate, and a measurement is then performed on the particle by using the basis $|0\rangle$, $|1\rangle$ 6. Pauli Matrix Some unitary matrices, that is, Pauli matrices, are further used in the present invention. A specific form is as follows:

$$I = |0\rangle\langle 0| + |1\rangle\langle 1| = \begin{pmatrix} 1 & 0 \\ 0 & 1 \end{pmatrix},$$

-continued $$X = |0\rangle\langle 1| + |1\rangle\langle 0| = \begin{pmatrix} 0 & 1 \\ 1 & 0 \end{pmatrix},$$

$$Y = |0\rangle\langle 1| - |1\rangle\langle 0| = \begin{pmatrix} 0 & 1 \\ -1 & 0 \end{pmatrix},$$

$$Z = |0\rangle\langle 0| - |1\rangle\langle 1| = \begin{pmatrix} 1 & 0 \\ 0 & -1 \end{pmatrix}.$$

A method for setting and operating redundant paths in a quantum communication network of the present invention includes:

path selection: when one node needs to transmit information in an unknown quantum state to another node in a network, establishing n possible paths, where one of the paths is used as a working path, the remaining n−1 paths are used as protection paths, and the paths do not intersect with each other; and signal transmission: implementing simultaneous transmission of signals on the working path and the protection paths, where the signal transmitted on the working path is a primary signal, and the signals transmitted on the protection paths are follow-up signals; in a case that the working path is normal, forwarding the primary signal on the working path level by level, to eventually implement long distance transmission of the signal; in a case that the working path fails, selecting a proxy working path from the remaining protection paths with the highest priority, and discarding the original working path, where the proxy working path maintains the transmission of the primary signal, and the other remaining protection paths are used as protection paths for the proxy working path to maintain the transmission of the follow-up signals; and if the proxy working path also fails, reselecting a working path from the remaining protection paths according to priority, discarding the original proxy working path, and repeating this process, until a transmission task is successfully completed.

The method for setting and operating redundant paths in a quantum communication network of the present invention is described below in detail by using the implementation processes of a method for establishing one working path and two protection paths and a method for establishing one working path and N protection paths.

I. The Method for Establishing One Working Path and Two Protection Paths

Figure 1:
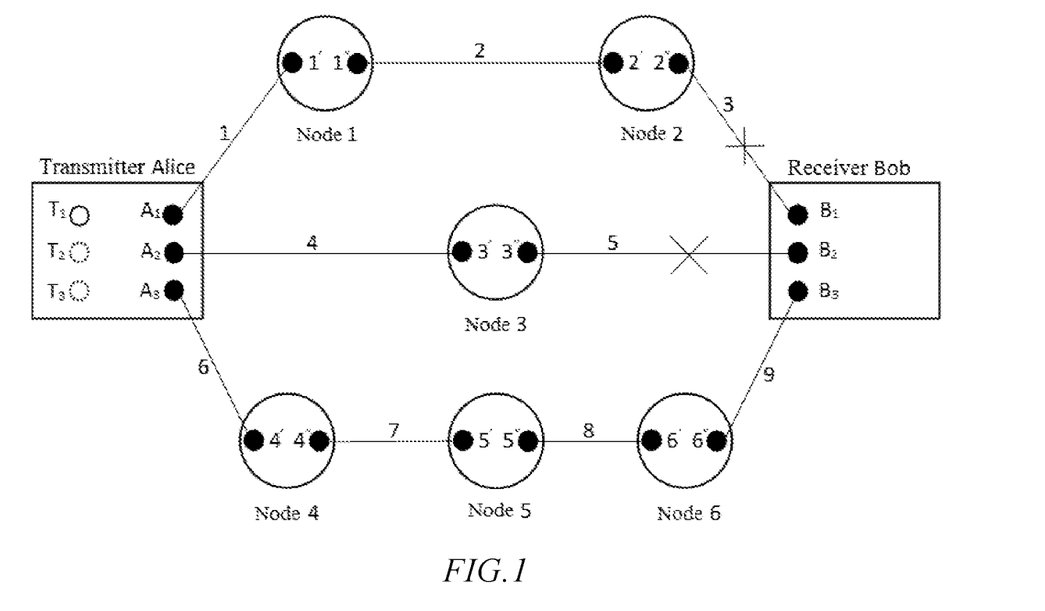
FIG. 1 is a simulation diagram of a solution with one working path and two protection paths according to the present invention.

1. As shown in FIG. 1, Alice is a transmitter, and Bob is a receiver. Alice intends to transmit unknown quantum information $a|0\rangle + b|1\rangle_{T_1}$ to Bob. A total of three feasible paths are set. The first path is an entire working path Alice→3→Bob (that is, formed by links 4 and 5) used for transmitting quantum information, and is denoted as W. The remaining two paths are protection paths Alice→1→2→Bob (that is, formed by links 1, 2, and 3) and Alice→4→5→6→Bob (that is, formed by links 6, 7, 8, and 9), and are respectively denoted as $P_1$, $P_2$. Therefore, it is necessary to introduce two auxiliary particles $|0\rangle$. A particle $T_1$ is used as a control particle to perform a CNOT operation on the two auxiliary particles. Therefore, the following status may be obtained:

$$a|000\rangle_{T_1T_2T_3} + b|111\rangle_{T_1T_2T_3}$$

In this case, an entire system formed by particles $T_1$, $T_2$, $T_3$, $A_1$, 1', $A_2$, 3', $A_3$ and 4' may be represented as:

$$|\zeta\rangle_{T_1T_2T_3A_11'A_23'A_34'} = \frac{1}{2\sqrt{2}}(a|000\rangle + b|111\rangle)_{T_1T_2T_3}$$

$$(|00\rangle + |11\rangle)_{A_11'}(|00\rangle + |11\rangle)_{A_23'}(|00\rangle + |11\rangle)_{A_34'}$$

Global variables are ignored. $(|00\rangle + |11\rangle)_{A_11'}$ is the link 1 formed by Alice and a node 1. $(|00\rangle + |11\rangle)_{A_23'}$ is the link 4 formed by Alice and a node 3. $(|00\rangle + |11\rangle)_{A_34'}$ is the link 6 formed by Alice and a node 4. Subsequently, Alice implements detection on the three links. In a case that all the links are normal, Alice needs to perform a Bell measurement on a particle of its own. Alice is formed by four measurement operators $|B_{00}\rangle\langle B_{00}|$, $|B_{01}\rangle\langle B_{01}|$, $|B_{10}\rangle\langle B_{10}|$, and $|B_{11}\rangle\langle B_{11}|$.

$$|B_{00}\rangle = |00\rangle + |11\rangle,$$

$$|B_{01}\rangle = |00\rangle - |11\rangle,$$

$$|B_{10}\rangle = |01\rangle + |10\rangle,$$

$$|B_{11}\rangle = |01\rangle + |10\rangle.$$

In this case, the entire system may be decomposed into:

$$|\zeta\rangle_{1'3'4'} = (|B_{00}\rangle|B_{00}\rangle|B_{00}\rangle\langle B_{00}|\langle B_{00}|\langle B_{00}| + |B_{01}\rangle|B_{00}\rangle|B_{00}\rangle\langle B_{00}|\langle B_{00}|\langle B_{01}| +$$

$$|B_{10}\rangle|B_{00}\rangle|B_{00}\rangle\langle B_{00}|\langle B_{00}|\langle B_{10}| + |B_{11}\rangle|B_{00}\rangle|B_{00}\rangle\langle B_{00}|\langle B_{00}|\langle B_{11}| +$$

$$|B_{00}\rangle|B_{01}\rangle|B_{00}\rangle\langle B_{00}|\langle B_{01}|\langle B_{00}| + |B_{01}\rangle|B_{01}\rangle|B_{00}\rangle\langle B_{00}|\langle B_{01}|\langle B_{01}| +$$

$$|B_{10}\rangle|B_{01}\rangle|B_{00}\rangle\langle B_{00}|\langle B_{01}|\langle B_{10}| + |B_{11}\rangle|B_{01}\rangle|B_{00}\rangle\langle B_{00}|\langle B_{01}|\langle B_{11}| +$$

$$|B_{00}\rangle|B_{10}\rangle|B_{00}\rangle\langle B_{00}|\langle B_{10}|\langle B_{00}| + |B_{01}\rangle|B_{10}\rangle|B_{00}\rangle\langle B_{00}|\langle B_{10}|\langle B_{01}| +$$

$$|B_{10}\rangle|B_{10}\rangle|B_{00}\rangle\langle B_{00}|\langle B_{10}|\langle B_{10}| + |B_{11}\rangle|B_{10}\rangle|B_{00}\rangle\langle B_{00}|\langle B_{10}|\langle B_{11}| +$$

$$|B_{00}\rangle|B_{11}\rangle|B_{00}\rangle\langle B_{00}|\langle B_{11}|\langle B_{00}| +$$

$$|B_{01}\rangle|B_{11}\rangle|B_{00}\rangle\langle B_{00}|\langle B_{11}|\langle B_{01}| + |B_{10}\rangle|B_{11}\rangle|B_{00}\rangle\langle B_{00}|\langle B_{11}|\langle B_{10}| +$$

$$|B_{11}\rangle|B_{11}\rangle|B_{00}\rangle\langle B_{00}|\langle B_{11}|\langle B_{11}| + |B_{00}\rangle|B_{00}\rangle|B_{01}\rangle\langle B_{01}|\langle B_{00}|\langle B_{00}| +$$

$$|B_{01}\rangle|B_{00}\rangle|B_{01}\rangle\langle B_{01}|\langle B_{00}|\langle B_{01}| + |B_{10}\rangle|B_{00}\rangle|B_{01}\rangle\langle B_{01}|\langle B_{00}|\langle B_{10}| +$$

$$|B_{11}\rangle|B_{00}\rangle|B_{01}\rangle\langle B_{01}|\langle B_{00}|\langle B_{11}| + |B_{00}\rangle|B_{01}\rangle|B_{01}\rangle\langle B_{01}|\langle B_{01}|\langle B_{00}| +$$

$$|B_{01}\rangle|B_{01}\rangle|B_{01}\rangle\langle B_{01}|\langle B_{01}|\langle B_{01}| + |B_{10}\rangle|B_{01}\rangle|B_{01}\rangle\langle B_{01}|\langle B_{01}|\langle B_{10}| +$$

$$|B_{11}\rangle|B_{01}\rangle|B_{01}\rangle\langle B_{01}|\langle B_{01}|\langle B_{11}| + |B_{00}\rangle|B_{10}\rangle|B_{01}\rangle\langle B_{01}|\langle B_{10}|\langle B_{00}| +$$

$$|B_{01}\rangle|B_{10}\rangle|B_{01}\rangle\langle B_{01}|\langle B_{10}|\langle B_{01}| + |B_{10}\rangle|B_{10}\rangle|B_{01}\rangle\langle B_{01}|\langle B_{10}|\langle B_{10}| +$$

$$|B_{11}\rangle|B_{10}\rangle|B_{01}\rangle\langle B_{01}|\langle B_{10}|\langle B_{11}| + |B_{00}\rangle|B_{11}\rangle|B_{01}\rangle\langle B_{01}|\langle B_{11}|\langle B_{00}| +$$

$$|B_{01}\rangle|B_{11}\rangle|B_{01}\rangle\langle B_{01}|\langle B_{11}|\langle B_{01}| + |B_{10}\rangle|B_{11}\rangle|B_{01}\rangle\langle B_{01}|\langle B_{11}|\langle B_{10}| +$$

$$|B_{11}\rangle|B_{11}\rangle|B_{01}\rangle\langle B_{01}|\langle B_{11}|\langle B_{11}| + |B_{00}\rangle|B_{00}\rangle|B_{10}\rangle\langle B_{10}|\langle B_{00}|\langle B_{00}| +$$

$$|B_{01}\rangle|B_{00}\rangle|B_{10}\rangle\langle B_{10}|\langle B_{00}|\langle B_{01}| + |B_{10}\rangle|B_{00}\rangle|B_{10}\rangle\langle B_{10}|\langle B_{00}|\langle B_{10}| +$$

$$|B_{11}\rangle|B_{00}\rangle|B_{10}\rangle\langle B_{10}|\langle B_{00}|\langle B_{11}| + |B_{00}\rangle|B_{01}\rangle|B_{10}\rangle\langle B_{10}|\langle B_{01}|\langle B_{00}| +$$

$$|B_{01}\rangle|B_{01}\rangle|B_{10}\rangle\langle B_{10}|\langle B_{01}|\langle B_{01}| + |B_{10}\rangle|B_{01}\rangle|B_{10}\rangle\langle B_{10}|\langle B_{01}|\langle B_{10}| +$$

$$|B_{11}\rangle|B_{01}\rangle|B_{10}\rangle\langle B_{10}|\langle B_{01}|\langle B_{11}| + |B_{00}\rangle|B_{10}\rangle|B_{10}\rangle\langle B_{10}|\langle B_{10}|\langle B_{00}| +$$

$$|B_{01}\rangle|B_{10}\rangle|B_{10}\rangle\langle B_{10}|\langle B_{10}|\langle B_{01}| + |B_{10}\rangle|B_{10}\rangle|B_{10}\rangle\langle B_{10}|\langle B_{10}|\langle B_{10}| +$$

$$|B_{11}\rangle|B_{10}\rangle|B_{10}\rangle\langle B_{10}|\langle B_{10}|\langle B_{11}| + |B_{00}\rangle|B_{11}\rangle|B_{10}\rangle\langle B_{10}|\langle B_{11}|\langle B_{00}| +$$

$$|B_{01}\rangle|B_{11}\rangle|B_{10}\rangle\langle B_{10}|\langle B_{11}|\langle B_{01}| + |B_{10}\rangle|B_{11}\rangle|B_{10}\rangle\langle B_{10}|\langle B_{11}|\langle B_{10}| +$$

$$|B_{11}\rangle|B_{11}\rangle|B_{10}\rangle\langle B_{10}|\langle B_{11}|\langle B_{11}| + |B_{00}\rangle|B_{00}\rangle|B_{11}\rangle\langle B_{11}|\langle B_{00}|\langle B_{00}| +$$

$$|B_{01}\rangle|B_{00}\rangle|B_{11}\rangle\langle B_{11}|\langle B_{00}|\langle B_{01}| + |B_{10}\rangle|B_{00}\rangle|B_{11}\rangle\langle B_{11}|\langle B_{00}|\langle B_{10}| +$$

$$|B_{11}\rangle|B_{00}\rangle|B_{11}\rangle\langle B_{11}|\langle B_{00}|\langle B_{11}| + |B_{00}\rangle|B_{01}\rangle|B_{11}\rangle\langle B_{11}|\langle B_{01}|\langle B_{00}| +$$

$$|B_{01}\rangle|B_{01}\rangle|B_{11}\rangle\langle B_{11}|\langle B_{01}|\langle B_{01}| + |B_{10}\rangle|B_{01}\rangle|B_{11}\rangle\langle B_{11}|\langle B_{01}|\langle B_{10}| +$$

$$|B_{11}\rangle|B_{01}\rangle|B_{11}\rangle\langle B_{11}|\langle B_{01}|\langle B_{11}| + |B_{00}\rangle|B_{10}\rangle|B_{11}\rangle\langle B_{11}|\langle B_{10}|\langle B_{00}| +$$

$$|B_{01}\rangle|B_{10}\rangle|B_{11}\rangle\langle B_{11}|\langle B_{10}|\langle B_{01}| + |B_{10}\rangle|B_{10}\rangle|B_{11}\rangle\langle B_{11}|\langle B_{10}|\langle B_{10}| +$$

$$|B_{11}\rangle|B_{10}\rangle|B_{11}\rangle\langle B_{11}|\langle B_{10}|\langle B_{11}| + |B_{00}\rangle|B_{11}\rangle|B_{11}\rangle\langle B_{11}|\langle B_{11}|\langle B_{00}| +$$

-continued $$|B_{01}\rangle|B_{11}\rangle|B_{11}\rangle\langle B_{11}|\langle B_{01}| + |B_{10}\rangle|B_{11}\rangle|B_{11}\rangle\langle B_{11}|\langle B_{10}| +$$

$$|B_{11}\rangle|B_{11}\rangle|B_{11}\rangle\langle B_{11}|\langle B_{11}|\langle B_{11}|)|\zeta\rangle_{T_1T_2T_3A_1'A_2 3'A_3 4'}$$

When Alice performs a Bell measurement on $\{T_1, A_1\}\{T_2, A_2\}\{T_3, A_3\}$, 64 different result combinations are obtained, and are shown in the following four tables:

TABLE 1

| $|B\rangle_{T_1A_1}$ | $|B\rangle_{T_2A_2}$ | $|B\rangle_{T_3A_3}$ | $|\zeta\rangle_{1'3'4'}$ |
|---|---|---|---|
| $|\phi^+\rangle_{T_1A_1}$ | $|\phi^+\rangle_{T_2A_2}$ | $|\phi^+\rangle_{T_3A_3}$ | $a|000\rangle + b|111\rangle$ |
| | | $|\phi^-\rangle_{T_3A_3}$ | $a|000\rangle - b|111\rangle$ |
| | | $|\varphi^+\rangle_{T_3A_3}$ | $a|001\rangle + b|110\rangle$ |
| | | $|\varphi^-\rangle_{T_3A_3}$ | $a|001\rangle - b|110\rangle$ |
| | $|\phi^-\rangle_{T_2A_2}$ | $|\phi^+\rangle_{T_3A_3}$ | $a|000\rangle - b|111\rangle$ |
| | | $|\phi^-\rangle_{T_3A_3}$ | $a|000\rangle + b|111\rangle$ |
| | | $|\varphi^+\rangle_{T_3A_3}$ | $a|001\rangle - b|110\rangle$ |
| | | $|\varphi^-\rangle_{T_3A_3}$ | $a|001\rangle + b|110\rangle$ |
| | $|\varphi^+\rangle_{T_2A_2}$ | $|\phi^+\rangle_{T_3A_3}$ | $a|010\rangle + b|101\rangle$ |
| | | $|\phi^-\rangle_{T_3A_3}$ | $a|010\rangle - b|101\rangle$ |
| | | $|\varphi^+\rangle_{T_3A_3}$ | $a|011\rangle + b|100\rangle$ |
| | | $|\varphi^-\rangle_{T_3A_3}$ | $a|011\rangle - b|100\rangle$ |
| | $|\varphi^-\rangle_{T_2A_2}$ | $|\phi^+\rangle_{T_3A_3}$ | $a|010\rangle - b|101\rangle$ |
| | | $|\phi^-\rangle_{T_3A_3}$ | $a|010\rangle + b|101\rangle$ |
| | | $|\varphi^+\rangle_{T_3A_3}$ | $a|011\rangle - b|100\rangle$ |
| | | $|\varphi^-\rangle_{T_3A_3}$ | $a|011\rangle + b|100\rangle$ |

TABLE 2

| $|B\rangle_{T_1A_1}$ | $|B\rangle_{T_2A_2}$ | $|B\rangle_{T_3A_3}$ | $|\zeta\rangle_{1'3'4'}$ |
|---|---|---|---|
| $|\phi^-\rangle_{T_1A_1}$ | $|\phi^+\rangle_{T_2A_2}$ | $|\phi^+\rangle_{T_3A_3}$ | $a|000\rangle - b|111\rangle$ |
| | | $|\phi^-\rangle_{T_3A_3}$ | $a|000\rangle + b|111\rangle$ |
| | | $|\varphi^+\rangle_{T_3A_3}$ | $a|001\rangle - b|110\rangle$ |
| | | $|\varphi^-\rangle_{T_3A_3}$ | $a|001\rangle + b|110\rangle$ |
| | $|\phi^-\rangle_{T_2A_2}$ | $|\phi^+\rangle_{T_3A_3}$ | $a|000\rangle + b|111\rangle$ |
| | | $|\phi^-\rangle_{T_3A_3}$ | $a|000\rangle - b|111\rangle$ |
| | | $|\varphi^+\rangle_{T_3A_3}$ | $a|001\rangle + b|110\rangle$ |
| | | $|\varphi^-\rangle_{T_3A_3}$ | $a|001\rangle - b|110\rangle$ |
| | $|\varphi^+\rangle_{T_2A_2}$ | $|\phi^+\rangle_{T_3A_3}$ | $a|010\rangle - b|101\rangle$ |
| | | $|\phi^-\rangle_{T_3A_3}$ | $a|010\rangle + b|101\rangle$ |
| | | $|\varphi^+\rangle_{T_3A_3}$ | $a|011\rangle - b|100\rangle$ |
| | | $|\varphi^-\rangle_{T_3A_3}$ | $a|011\rangle + b|100\rangle$ |
| | $|\varphi^-\rangle_{T_2A_2}$ | $|\phi^+\rangle_{T_3A_3}$ | $a|010\rangle + b|101\rangle$ |
| | | $|\phi^-\rangle_{T_3A_3}$ | $a|010\rangle - b|101\rangle$ |
| | | $|\varphi^+\rangle_{T_3A_3}$ | $a|011\rangle + b|100\rangle$ |
| | | $|\varphi^-\rangle_{T_3A_3}$ | $a|011\rangle - b|100\rangle$ |

TABLE 3

| $|B\rangle_{T_1A_1}$ | $|B\rangle_{T_2A_2}$ | $|B\rangle_{T_3A_3}$ | $|\zeta\rangle_{1'3'4'}$ |
|---|---|---|---|
| $|\varphi^+\rangle_{T_1A_1}$ | $|\phi^+\rangle_{T_2A_2}$ | $|\phi^+\rangle_{T_3A_3}$ | $a|100\rangle + b|011\rangle$ |
| | | $|\phi^-\rangle_{T_3A_3}$ | $a|100\rangle - b|011\rangle$ |
| | | $|\varphi^+\rangle_{T_3A_3}$ | $a|101\rangle + b|010\rangle$ |
| | | $|\varphi^-\rangle_{T_3A_3}$ | $a|101\rangle - b|010\rangle$ |
| | $|\phi^-\rangle_{T_2A_2}$ | $|\phi^+\rangle_{T_3A_3}$ | $a|100\rangle - b|011\rangle$ |
| | | $|\phi^-\rangle_{T_3A_3}$ | $a|100\rangle + b|011\rangle$ |
| | | $|\varphi^+\rangle_{T_3A_3}$ | $a|101\rangle - b|010\rangle$ |
| | | $|\varphi^-\rangle_{T_3A_3}$ | $a|101\rangle + b|010\rangle$ |
| | $|\varphi^+\rangle_{T_2A_2}$ | $|\phi^+\rangle_{T_3A_3}$ | $a|110\rangle + b|001\rangle$ |
| | | $|\phi^-\rangle_{T_3A_3}$ | $a|110\rangle - b|001\rangle$ |
| | | $|\varphi^+\rangle_{T_3A_3}$ | $a|111\rangle + b|000\rangle$ |
| | | $|\varphi^-\rangle_{T_3A_3}$ | $a|111\rangle - b|000\rangle$ |
| | $|\varphi^-\rangle_{T_2A_2}$ | $|\phi^+\rangle_{T_3A_3}$ | $a|110\rangle - b|001\rangle$ |
| | | $|\phi^-\rangle_{T_3A_3}$ | $a|110\rangle + b|001\rangle$ |
| | | $|\varphi^+\rangle_{T_3A_3}$ | $a|111\rangle - b|000\rangle$ |
| | | $|\varphi^-\rangle_{T_3A_3}$ | $a|111\rangle + b|000\rangle$ |

TABLE 4

| $|B\rangle_{T_1A_1}$ | $|B\rangle_{T_2A_2}$ | $|B\rangle_{T_3A_3}$ | $|\zeta\rangle_{1'3'4'}$ |
|---|---|---|---|
| $|\varphi^+\rangle_{T_1A_1}$ | $|\phi^+\rangle_{T_2A_2}$ | $|\phi^+\rangle_{T_3A_3}$ | $a|100\rangle - b|011\rangle$ |
| | | $|\phi^-\rangle_{T_3A_3}$ | $a|100\rangle + b|011\rangle$ |
| | | $|\varphi^+\rangle_{T_3A_3}$ | $a|101\rangle - b|010\rangle$ |
| | | $|\varphi^-\rangle_{T_3A_3}$ | $a|101\rangle + b|010\rangle$ |
| | $|\phi^-\rangle_{T_2A_2}$ | $|\phi^+\rangle_{T_3A_3}$ | $a|100\rangle + b|011\rangle$ |
| | | $|\phi^-\rangle_{T_3A_3}$ | $a|100\rangle - b|011\rangle$ |
| | | $|\varphi^+\rangle_{T_3A_3}$ | $a|101\rangle + b|010\rangle$ |
| | | $|\varphi^-\rangle_{T_3A_3}$ | $a|101\rangle - b|010\rangle$ |
| | $|\varphi^+\rangle_{T_2A_2}$ | $|\phi^+\rangle_{T_3A_3}$ | $a|110\rangle - b|001\rangle$ |
| | | $|\phi^-\rangle_{T_3A_3}$ | $a|110\rangle + b|001\rangle$ |
| | | $|\varphi^+\rangle_{T_3A_3}$ | $a|111\rangle - b|000\rangle$ |
| | | $|\varphi^-\rangle_{T_3A_3}$ | $a|111\rangle + b|000\rangle$ |
| | $|\varphi^-\rangle_{T_2A_2}$ | $|\phi^+\rangle_{T_3A_3}$ | $a|110\rangle + b|001\rangle$ |
| | | $|\phi^-\rangle_{T_3A_3}$ | $a|110\rangle - b|001\rangle$ |
| | | $|\varphi^+\rangle_{T_3A_3}$ | $a|111\rangle + b|000\rangle$ |
| | | $|\varphi^-\rangle_{T_3A_3}$ | $a|111\rangle - b|000\rangle$ |

2. The Working Path W is Normal.

In a case that the node 3 determines that the working path W is normal, the node 3 instructs the node 1 and the node 4 to perform an H measurement. That is, an H transform of the particles 1', 4' is first performed, and a measurement is then performed by using the basis $|0\rangle$, $|1\rangle$.

$$|\zeta\rangle_{3'} = (|H_0\rangle|H_0\rangle\langle H_0|\langle H_0| + |H_1\rangle|H_0\rangle\langle H_0|\langle H_1| + H_0\rangle$$

$$|H_1\rangle\langle H_1|\langle H_0| + |H_1\rangle|H_1\rangle\langle H_1|\langle H_1|)|\zeta\rangle_{1'3'4'}$$

Measurement results of the nodes 1 and 4 are collected. In this case, only the following four cases may be obtained for the status of the particle 3' in the node 3:

$$a|0\rangle_{3'} + b|1\rangle_{3'},$$

$$a|0\rangle_{3'} - b|1\rangle_{3'},$$

$$a|1\rangle_{3'} + b|0\rangle_{3'},$$

$$a|1\rangle_{3'} - b|0\rangle_{3'}.$$

Measurement results are transmitted to Bob through a classic channel. In this case, the node 3 then performs a Bell measurement on the particles 3' and 3'' possessed by itself, and $B_2$. $(|00\rangle + |11\rangle)_{3''B_2}$ is the link 5 formed by the node 3 and Bob:

$$|\zeta\rangle_{B_2} = \frac{1}{\sqrt{2}}(|B_{00}\rangle\langle B_{00}| + |B_{01}\rangle\langle B_{01}| + |B_{10}\rangle\langle B_{10}| + |B_{11}\rangle\langle B_{11}|)_{3'3''}$$

$$|\zeta\rangle_{3'}(|00\rangle + |11\rangle)_{3''B_2}.$$

Bob is informed of the measurement results. Bob finally selects a corresponding unitary operation according to the measurement results of the nodes to restore $|\zeta\rangle_{B_2}$. A specific case is shown in Table 5.

TABLE 5

| Results obtained by Bob | unitary operation |
|---|---|
| $a|0\rangle_{B_2} + b|1\rangle_{B_2}$ | I |
| $a|0\rangle_{B_2} - b|1\rangle_{B_2}$ | Z |
| $a|1\rangle_{B_2} + b|0\rangle_{B_2}$ | X |
| $a|1\rangle_{B_2} - b|0\rangle_{B_2}$ | Y |

3. The Working Path W Fails, and the Protection Path $P_1$ is Normal.

If the working path fails at the link 5, the node 3 sends instructions to the node 1 and the node 4 and performs an H measurement on the particle 3', and the working path is disabled.

$$|\zeta\rangle_{1'4'} = (|H_0\rangle \langle H_0| + |H_1\rangle \langle H_1|)_{3'}|\zeta\rangle_{1'3'4'}$$

All the foregoing measurement results are collected. In this case, only the following eight cases may be obtained for the statuses of the particles 1' and 4' in $|\zeta\rangle_{1'4'}$:

$a|00\rangle_{1',4'} + b|11\rangle_{1',4'}$, $a|00\rangle_{1',4'} - b|11\rangle_{1',4'}$, $a|01\rangle_{1',4'} + b|10\rangle_{1',4'}$, $a|01\rangle_{1',4'} - b|10\rangle_{1',4'}$, $a|10\rangle_{1',4'} + b|01\rangle_{1',4'}$, $a|10\rangle_{1',4'} - b|01\rangle_{1',4'}$, $a|11\rangle_{1',4'} + b|00\rangle_{1',4'}$, $a|11\rangle_{1',4'} - b|00\rangle_{1',4'}$, In this case, it is necessary to reselect a working path. A redundant path with high priority is preferentially selected. The path $P_1$ is used as a proxy working path. After receiving the instructions, the node 1 performs a Bell measurement on the particles 1' and 1" possessed by itself, and the node 4 performs a Bell measurement on the particles 4' and 4" possessed by itself. $(|00\rangle + |11\rangle)_{1''2'}$ is the link 2 formed by the node 1 and a node 2. $(|00\rangle + |11\rangle)_{4''5'}$ is the link 7 formed by the node 4 and a node 5.

$|\zeta\rangle_{2'5'} =$ $\frac{1}{\sqrt{2}}(|B_{00}\rangle|B_{00}\rangle\langle B_{00}|\langle B_{00}| + |B_{01}\rangle|B_{00}\rangle\langle B_{00}|\langle B_{01}| + |B_{10}\rangle|B_{00}\rangle\langle B_{00}|\langle B_{10}| +$ $|B_{11}\rangle|B_{00}\rangle\langle B_{00}|\langle B_{11}| + B_{00}\rangle|B_{01}\rangle\langle B_{01}|\langle B_{00}| + |B_{01}\rangle$ $|B_{01}\rangle\langle B_{01}|\langle B_{01}| + |B_{01}\rangle|B_{01}\rangle\langle B_{01}$ $|\langle B_{10}| + |B_{11}\rangle|B_{01}\rangle\langle B_{01}|\langle B_{11}| + |B_{00}\rangle$ $|B_{10}\rangle\langle B_{10}|\langle B_{00}| + |B_{01}\rangle|B_{10}\rangle\langle B_{10}|\langle B_{01}$ $|+|B_{10}\rangle|B_{10}\rangle\langle B_{10}|\langle B_{10}| + |B_{11}\rangle|B_{10}\rangle$ $\langle B_{10}|\langle B_{11}| + |B_{00}\rangle|B_{11}\rangle\langle B_{11}|\langle B_{00}| +$ $|B_{01}\rangle|B_{11}\rangle\langle B_{11}|\langle B_{01}| + |B_{10}\rangle|B_{11}\rangle$ $\langle B_{11}|\langle B_{10}| + |B_{11}\rangle|B_{11}\rangle\langle B_{11}|\langle B_{11}|)$ $|\zeta\rangle_{1'4'}(|00\rangle + |11\rangle)_{1''2'}(|00\rangle + |11\rangle)_{4''5'}$ All the foregoing measurement results are collected. In this case, only the following eight cases may be obtained for the particles 2' and 5' in $|\zeta\rangle_{2'5'}$:

$a|00\rangle_{2',5'} + b|11\rangle_{2',5'}$, $a|00\rangle_{2',5'} - b|11\rangle_{2',5'}$, $a|01\rangle_{2',5'} + b|10\rangle_{2',5'}$, $a|01\rangle_{2',5'} - b|10\rangle_{2',5'}$, $a|10\rangle_{2',5'} + b|01\rangle_{2',5'}$, $a|10\rangle_{2',5'} - b|01\rangle_{2',5'}$, $a|11\rangle_{2',5'} + b|00\rangle_{2',5'}$, $a|11\rangle_{2',5'} - b|00\rangle_{2',5'}$.

In this way, the information is transmitted to the node 2 and the node 5. In a case that it is ensured that the link 3 in the proxy working path is normal, the node 2 sends an instruction to the node 5. In this case, the node 5 needs to perform an H measurement on the particle 5', and informs Bob of a measurement result through a classic channel.

$$|\zeta\rangle_{2'} = (|H_0\rangle \langle H_0| + |H_1\rangle \langle H_1|)_{5'}|\zeta\rangle_{2'5'}$$

All the foregoing measurement results are collected. In this case, only the following four cases may be obtained for the particles 2' in the node 2:

$a|0\rangle_{2'} + b|1\rangle_{2'}$, $a|0\rangle_{2'} - b|1\rangle_{2'}$, $a|1\rangle_{2'} + b|0\rangle_{2'}$, $a|1\rangle_{2'} - b|0\rangle_{2'}$, In this case, the node 2 then performs a Bell measurement on the particles 2' and 2" in the system formed by the particles 2', 2" and $B_1$, and Bob is informed of the results.

$$|\zeta\rangle_{B_1} = \frac{1}{\sqrt{2}}(|B_{00}\rangle\langle B_{00}| + |B_{01}\rangle\langle B_{01}| + |B_{10}\rangle\langle B_{10}| + |B_{11}\rangle\langle B_{11}|)_{2'2''}|\zeta\rangle_{2'}$$

$$(|00\rangle + |11\rangle)_{2''B_1}$$

Wherein $(|00\rangle + |11\rangle)_{2''B_1}$ is the link 3 formed by the node 2 and Bob. Bob may implement a corresponding operation on $|\zeta\rangle B_1$ according to the measurement results of the nodes to obtain a transmission state.

4. The working path W and the protection path $P_1$ fail, and the protection path $P_2$ is normal.

If the working path fails and the protection path $P_1$ fails at the link 3, in this case, the node 2 needs to send an instruction to the node 5 and performs an H measurement on the particle 2', and the path is disabled.

$$|\zeta\rangle_{5'} = (|H_0\rangle \langle H_0| + |H_1\rangle \langle H_1|)_{2'}|\zeta\rangle_{2'5'}$$

All the foregoing measurement results are collected. In this case, only the following four cases may be obtained for the node 5:

$a|0\rangle_{5'} + b|1\rangle_{5'}$, $a|0\rangle_{5'} - b|1\rangle_{5'}$, $a|1\rangle_{5'} + b|0\rangle_{5'}$, $a|0\rangle_{5'} - b|1\rangle_{5'}$, In this case, the protection path $P_2$ is selected as the proxy working path to continue with the transmission. After receiving the instruction, the node 5 performs a Bell measurement on the particles 5' and 5" in the system formed by the particles 5', 5" and 6'.

$$|\zeta\rangle_{6'} = \frac{1}{\sqrt{2}}(|B_{00}\rangle\langle B_{00}| + |B_{01}\rangle\langle B_{01}| + |B_{10}\rangle\langle B_{10}| + |B_{11}\rangle\langle B_{11}|)_{5'5''}$$

$$|\zeta\rangle_{5'}(|00\rangle + |11\rangle)_{5''6'}$$

$(|00\rangle + |11\rangle)_{5''6'}$ is the link 8 formed by the node 5 and a node 6. After receiving the information, the node 6 starts to perform a Bell measurement on particles 6' and 6" in the system formed by the particles 6', 6" and $B_3$, and informs Bob of the measurement results. $(|00\rangle+|11\rangle)_{6''B_3}$ is the link 9 formed by the node 6 and Bob.

$$|\zeta\rangle_{B_3} = \frac{1}{\sqrt{2}}(|B_{00}\rangle\langle B_{00}|+|B_{01}\rangle\langle B_{01}|+|B_{10}\rangle\langle B_{10}|+|B_{11}\rangle\langle B_{11}|)_{6'6''}$$

$$|\zeta\rangle_{6'}(|00\rangle+|11\rangle)_{6''B_3}$$

Finally, Bob then performs a corresponding unitary operation according to the measurement results of the nodes and Table 5. In this way, Bob may obtain a Transmission State with a Probability of 100%.

II. The method for establishing one working path and N protection paths

Figure 2:
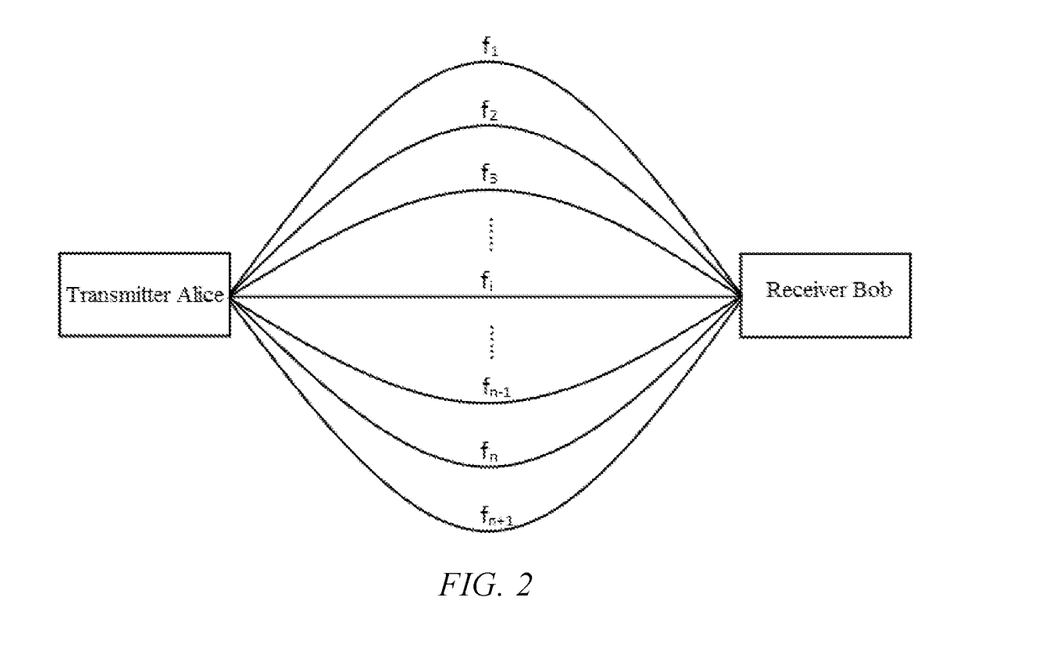
FIG. 2 is a simulation diagram of a general solution with one working path and n protection paths according to the present invention.
Figure 3:
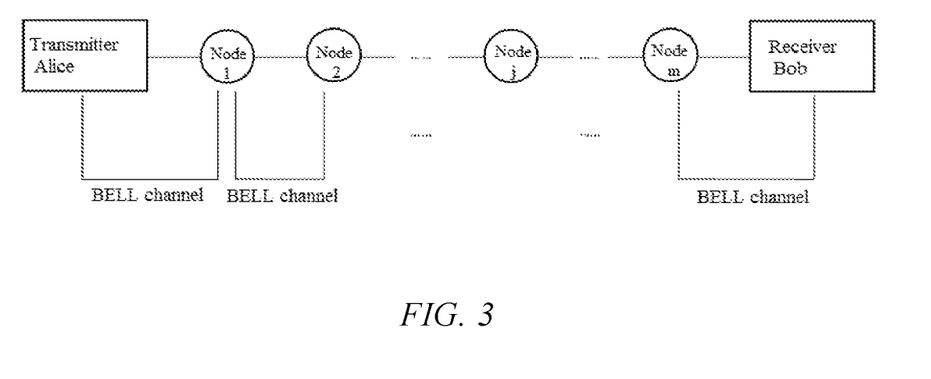
FIG. 3 is a simulation diagram of a solution of branches with one working path and n protection paths according to the present invention.
Figure 4:
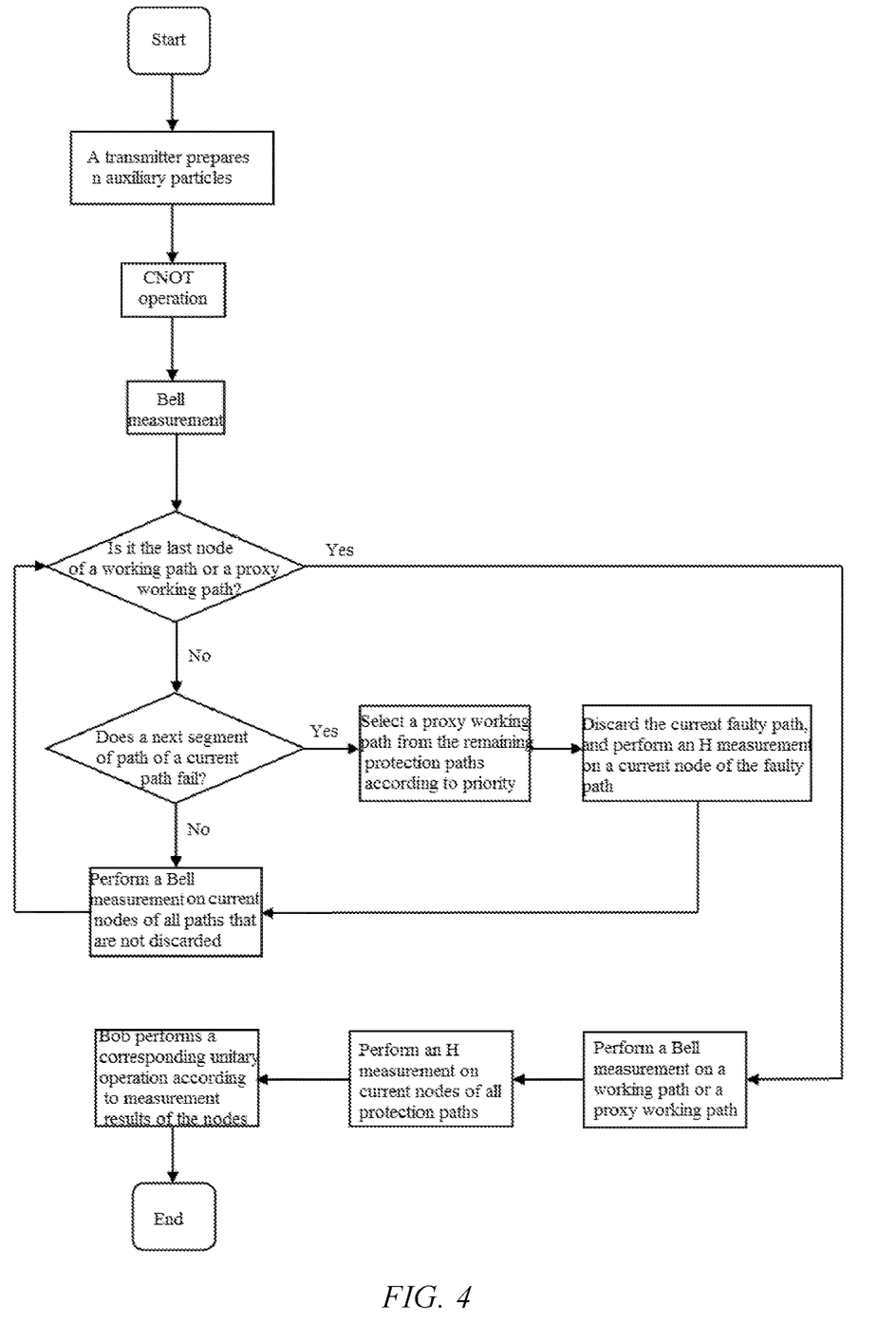
FIG. 4 is a flowchart of a solution of designing redundant paths with one working path and n protection paths according to the present invention.

It is assumed that Alice is a transmitter and Bob is a receiver. Alice intends to transmit unknown quantum information $a|0\rangle T_1+b|1\rangle T_1$ to Bob. It is assumed that there are N+1 channels between Alice and Bob. One of the channels is a working channel, and N channels are protection channels. The channels are respectively set to $f_1, f_2, \ldots, f_{n+1}$, as shown in FIG. 2.

First, Alice needs to add N auxiliary particles $|0\rangle$, and sequentially performs CNOT operations on the particle $T_1$ and subsequent auxiliary particles to obtain the following status:

$$a|00\ldots0\rangle_{T_1T_2\ldots T_{n+1}}+b|11\ldots1\rangle_{T_1T_2\ldots T_{n+1}}$$

Alice then transmits the N+1 particles simultaneously. A more specific operation is that Alice performs a Bell measurement on a system formed by Alice and nodes adjacent to Alice. In a case that a working path $f_1$ is normal, after the information is transmitted to the last node, Alice instructs other nodes to perform an H measurement, and Alice performs a Bell measurement. The measurement results are transmitted to Bob through a classic channel. Bob selects a corresponding unitary operation according to the measurement results of the nodes to obtain the information that Alice needs to transmit. In a case that if the working path fails, a current node sends an instruction to other nodes to which the information has been transmitted, and the current node itself performs an H measurement. A path with the highest priority is selected from the remaining paths as a proxy working path, and the original working path is discarded. This process is repeated, until one completely normal path is found. In this case, if the information is transmitted to the last node of the proxy working path, the node performs a Bell measurement, and instructs other nodes to perform an H measurement. Bob is informed of the measurement results. Bob selects a corresponding unitary operation according to the measurement results of the nodes and Table 5, to receive, with a probability of 100%, the information transmitted by Alice.

The foregoing descriptions are only preferred implementations of the present invention, but are not used to limit the present invention. It should be noted that for a person of ordinary skill in the art, several improvements and variations may further be made without departing from the technical principle of the present invention. These improvements and variations should also be deemed as falling within the protection scope of the present invention.

What is claimed is:

1. A method for setting and operating redundant paths in a quantum communication network, comprising:
    selecting a working path: when one node starts to transmit information in an unknown quantum state to another node in a network, establishing n possible paths, wherein one of the paths is used as the working path, the remaining n−1 paths are used as protection paths, and the n possible paths do not intersect with each other, n being an integer greater than or equal to 3; and
    transmitting primary signals and follow-up signals: implementing simultaneous transmission of the primary and follow-up signals on the working path and the protection paths, wherein the signals transmitted on the working path are the primary signals, and the signals transmitted on the protection paths are the follow-up signals; when the working path is normal, forwarding the primary signals on the working path, to eventually implement a transmission of the primary signals; when the working path fails, selecting a proxy working path from the remaining n−1 paths with a highest priority, and discarding the working path, wherein the proxy working path maintains the transmission of the primary signals, and the remaining n−2 paths are used as protection paths for the proxy working path to maintain the transmission of the follow-up signals; and when the proxy working path also fails, reselecting a working path from the remaining n−2 paths according to priority, discarding the proxy working path, and repeating this process until a transmission task is successfully completed,
    wherein a shortest path is selected as the working path, and a path with fewest nodes is selected as a shortest path by default; when a plurality of paths have the same quantity of nodes, a path with a high priority is preferentially selected; and protection paths are set by using a CNOT operation, and priority is differentiated.

2. The method for setting and operating redundant paths in a quantum communication network according to claim 1, wherein the signal transmission comprises:
    preparing a corresponding quantity of auxiliary particles according to the selected working path, the protection paths, and a priority order of the paths, and sequentially performing a CNOT operation by using a particle to be transmitted as a control particle and other auxiliary particles as target particles;
    performing, by a transmitter, a corresponding Bell measurement on a particle in a Bell channel formed between the transmitter and a node adjacent to the transmitter and a particle possessed by the transmitter, to implement the simultaneous transmission of the primary signal and the follow-up signals; in a case that the working path does not fail, if a transmission state is successfully transmitted to the last node, performing, by a current node, a Bell measurement, instructing other nodes to first separately perform an H transform, then performing a measurement by using the basis $|0\rangle,|1\rangle$, and finally transmitting measurement results to a receiver; if a path fails, first performing an H transform at a faulty node to which the information is transmitted, then performing a measurement by using the basis $|0\rangle,|1\rangle$, disabling the working path in this case, and switching to a proxy working path, wherein the proxy working path is a remaining protection path with the highest priority and maintains the transmission of the primary signal; maintaining the normal transmission of the follow-up signals on the other protection paths; and after the primary signal is transmitted to the last node of the proxy working path, in a case that it is ensured that the path is normal, instructing other nodes to first separately perform an H transform, then performing a measurement by using the basis $|0\rangle,|1\rangle$, performing, by the last node, a Bell measurement, and informing the receiver of final measurement results; and choosing, by the receiver, a corresponding unitary operation according to the measurement results of the nodes to determine the information transmitted by Alice.

\* \* \* \* \*